United States Patent
Park

(10) Patent No.: US 9,516,135 B2
(45) Date of Patent: Dec. 6, 2016

(54) APPARATUS AND METHOD OF STORING USER INFORMATION IN HOME NETWORK

(71) Applicant: Samsung Electronics Co., Ltd., Gyeonggi-do (KR)

(72) Inventor: Sang-Min Park, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 243 days.

(21) Appl. No.: 13/910,337

(22) Filed: Jun. 5, 2013

(65) Prior Publication Data

US 2013/0332567 A1    Dec. 12, 2013

(30) Foreign Application Priority Data

Jun. 7, 2012    (KR) .................. 10-2012-0060930

(51) Int. Cl.
*G06F 15/16* (2006.01)
*H04L 29/08* (2006.01)
*H04L 12/28* (2006.01)

(52) U.S. Cl.
CPC ......... *H04L 67/306* (2013.01); *H04L 12/2829* (2013.01)

(58) Field of Classification Search
CPC ......... H04L 41/12; H04L 43/08; H04L 67/125
USPC .................................. 709/223, 224
See application file for complete search history.

(56) References Cited

U.S. PATENT DOCUMENTS

| | | | |
|---|---|---|---|
| 8,532,488 B2 * | 9/2013 | Nielsen et al. ................. 398/67 |
| 8,543,707 B2 * | 9/2013 | Jeong ..................... G06F 21/10 |
| | | | 709/227 |
| 8,627,075 B2 * | 1/2014 | Ikeda ...................... H04B 5/02 |
| | | | 455/41.1 |
| 9,020,432 B2 * | 4/2015 | Matsushita ....... H04L 12/40013 |
| | | | 455/41.1 |
| 2004/0003073 A1 | 1/2004 | Krzyzanowski et al. |
| 2004/0235463 A1 | 11/2004 | Patel |
| 2006/0190590 A1 | 8/2006 | Kim |
| 2008/0183853 A1 * | 7/2008 | Manion et al. ............... 709/223 |
| 2010/0293105 A1 | 11/2010 | Blinn et al. |
| 2011/0138416 A1 * | 6/2011 | Kang .................... G06F 3/0482 |
| | | | 725/39 |
| 2011/0182481 A1 * | 7/2011 | Dernis ............... G06K 9/00892 |
| | | | 382/116 |
| 2011/0252130 A1 * | 10/2011 | Karaoguz ..................... 709/224 |
| 2011/0270712 A1 * | 11/2011 | Wood .................... G01C 21/20 |
| | | | 705/27.1 |

(Continued)

*Primary Examiner* — Kristie Shingles
(74) *Attorney, Agent, or Firm* — Cha & Reiter, LLC

(57) ABSTRACT

Apparatus and method of storing user information in a home network. Mapping information is generated by mapping at least one terminal connected to the home network onto a pre-stored house schematic. Based on the mapping information, information associated with at least one adjacent terminal to a particular terminal is generated, where the adjacent terminal is capable of recognizing a user of the particular terminal. User information is generated based on the user-related information transmitted from the adjacent terminal to recognize the user of the particular terminal when a certain function is executed in the particular terminal. The user information is stored in association with usage history information for the certain function.

14 Claims, 4 Drawing Sheets

(56) References Cited

U.S. PATENT DOCUMENTS

2012/0120218 A1* 5/2012 Flaks .................. G10L 21/028
       348/77

* cited by examiner

APPARATUS AND METHOD OF STORING USER INFORMATION IN HOME NETWORK

CLAIM OF PRIORITY

This application claims the benefit under 35 U.S.C. §119 (a) of a Korean patent application filed in the Korean Intellectual Property Office on Jun. 7, 2012 and assigned Serial No. 10-2012-0060930, the entire disclosure of which is hereby incorporated by reference.

BACKGROUND

1. Technical Field

The present disclosure relates to a home network, and more particularly, to an apparatus and method of storing user information in a home network.

2. Description of the Related Art

A home network is a residential local area network between electronic devices typically utilized in the home, and may include both "personal" and "non-personal" terminals. A personal terminal refers to a terminal, such as a portable terminal (e.g., smart phone, tablet computer, etc.) that is typically used by a single individual. A non-personal terminal refers to a terminal, such as a television, a refrigerator, an oven, a washing machine, or the like that is commonly used by a plurality of users.

A home network server that supports the home network could discern a user's habits or preferences based on user information stored in the personal terminal, to improve the efficacy of the home network. For non-personal terminals, however, attempts have been made to provision home network servers to discern the habits or preferences of a group unit that uses the non-personal terminal However, if habits differ significantly among users, the utility in deducing these metrics is diminished.

SUMMARY

The present disclosure provides an apparatus and method of storing user information indicating a user who performs a certain function for a particular terminal among terminals included in a home network when the certain function is executed.

In one aspect, mapping information is generated by mapping at least one terminal connected to the home network onto a pre-stored house schematic. Based on the mapping information, information associated with at least one adjacent terminal to a particular terminal is generated, where the adjacent terminal is capable of recognizing a user of the particular terminal. User information is generated based on the user-related information transmitted from the adjacent terminal to recognize the user of the particular terminal when a certain function is executed in the particular terminal The user information is stored in association with usage history information for the certain function.

In another aspect, a method operable in a terminal connected in a home network involves capturing user-related information of a user for user recognition while a predetermined function is executed via operation of the user. The user-related information is transmitted to a server of the home network. The user-related information is captured through a camera within the terminal

BRIEF DESCRIPTION OF THE DRAWINGS

The above and other features and advantages of the present disclosure will become more apparent by describing in detail exemplary embodiments thereof with reference to the attached drawings in which.

DETAILED DESCRIPTION

Figure 1:
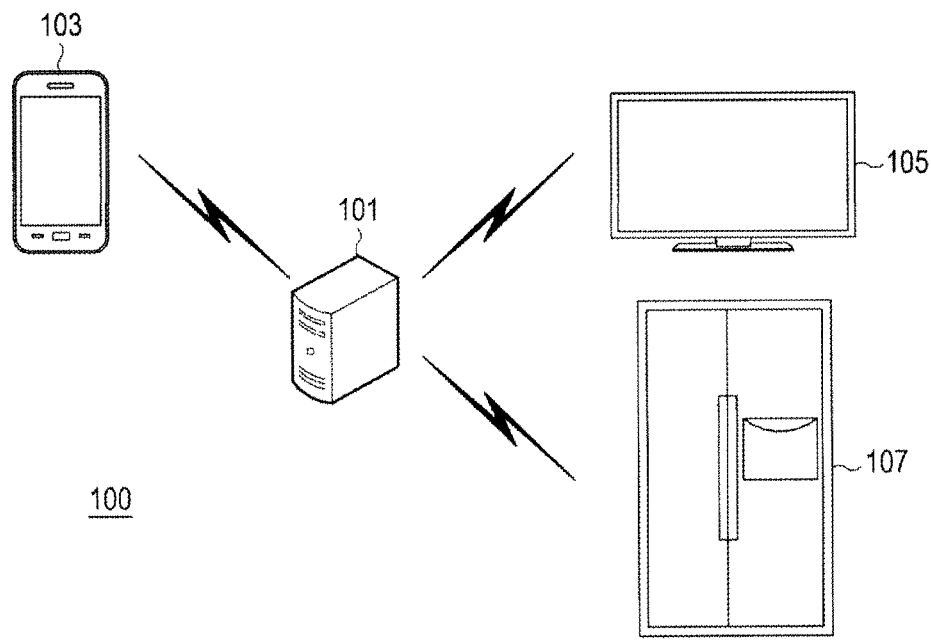
FIG. 1 illustrates an block diagram example of a home network system, according to an embodiment.

Reference will now be made in detail to embodiments, examples of which are illustrated in the accompanying drawings, wherein like reference numerals refer to the like elements throughout. Detailed description of well-known functionalities and configurations will be omitted to avoid unnecessarily obscuring the present invention.

Herein, a "terminal" refers to any electronic device capable of communicating with any other electronic device and/or with a home network server in the home network.

Portable terminals according to embodiments of the present invention are mobile electronic devices that are easily carried by humans (e.g., hand held devices). Portable terminal examples include video phones, cellular phones, smart phones, International Mobile Telecommunication-2000 (IM-2000) terminals, Wideband Code Division Multiple Access (WCDMA) terminals, Universal Mobile Telecommunication Service (UMTS) terminals, Personal Digital Assistants (PDAs), Portable Multimedia Players (PMPs), Digital Multimedia Broadcasting (DMB) terminals, E-Books, portable computers (e.g., laptops, tablet PCs, etc.), and digital cameras.

FIG. 1 illustrates a block diagram example of a home network system, 100, according to an embodiment of the present invention. Home network system 100 includes a home network server 101, a portable terminal 103, an imaging device 105, and a refrigerator 107. Each of these components 101, 103, 105, 107 is considered a "terminal" in the home network. Imaging device 105 can be a television (TV) or other display device capable of receiving an image feed and having wireless communication means built-in or connected thereto. Imaging device 105 will hereafter be exemplified as a TV 105 for simplicity of explanation; however, it is understood that other types of imaging devices are available.

The portable terminal 103 includes near-field wireless communication capability, and when receiving a portable terminal identification (ID) request message from another terminal such as the TV 105, generates portable terminal ID information to transmit to the other terminal The near-field wireless communication service may be, e.g., a wireless fidelity (Wi-Fi) service.

The portable terminal ID request message is a message to request ID information of the portable terminal 103; this ID information includes an identity of the portable terminal 103, which is a unique identity issued to that portable terminal For example, the identity of the portable terminal 103 may be a MAC address, a telephone number, or the like.

TV 105 provides a user recognition function, and generates "user-related information" including an identifier for identifying the user of TV 105. When a certain function of TV 105 is activated by the user, the user is identified via the user recognition function. TV 105 also checks channel information provided to the user, generates usage history information including the channel information, and transmits the generated user-related information and usage history information to the home network server 101. User-related information refers to information regarding the user, for example, an image of the user, the user's phone number (of his portable terminal), the user's name (if discernible by the terminal), or the like.

Herein, the term "certain function" is used to indicate any predetermined function for which it is desired to perform the user recognition function, i.e., to obtain user-related information. The user-related information can be obtained either from the terminal performing the certain function, or from an adjacent terminal in cases where the terminal performing the certain function does not or cannot obtain the required information. (The case of the adjacent terminal is discussed below.)

The user recognition function can be performed as a direct and/or indirect recognition function. A terminal for providing the direct recognition function (hereafter, a "Direct terminal", for brevity) may directly recognize the user by means of a camera module, a proximity sensor, a light sensor and the like included in the terminal For example, if the portable terminal 103, TV 105, and the refrigerator 107 each includes a camera module, the Direct terminal may be any of these terminals.

Specifically, when performing a certain function for which user recognition is desirable, the Direct terminal uses its camera module to generate an image of the user, and extracts user features from the generated image. The Direct terminal also generates recent usage history information including information related to the certain function, generates the user-related information including an image extracted to recognize the user, and transmits the generated usage history information and user-related information to the home network server 101. Alternatively, the Direct terminal may be equipped with processing hardware to perform the actual recognition of the user based on the image; in this case, the user's name or other ID can be transmitted to the server instead of the actual image as the user-related information.

It is noted here that the home network system 100 may be configured such that terminals (whether Direct or Indirect, the latter being described below) provide user-related and usage history information to server 101 in a number of alternative ways. In one embodiment, the information is sent by the terminal to the server 101 as soon as a user is recognized requesting to use the certain function, or who has initiated use of the certain function of the terminal In this case, the server may immediately attempt to identify the user through e.g., image recognition, and, once identified, check its own database of prior usage history for that user to ascertain whether specific commands should be transmitted back to the terminal to tailor its functionality to the particular user. For instance, if the recognized user of TV 105 is a child, the server may immediately command the TV to block child-inappropriate channels. As another example, if a recognized attempted user of an oven is an Alzheimer's patient, a command may be immediately sent to the oven to prevent its use.

In another embodiment, the information is sent periodically in a predetermined manner, e.g., every few minutes, once an hour or once a day. In this case, the information may be primarily used for building a database and for monitoring purposes. Also, the certain function(s) associated with the information for a particular terminal may be programmed/selected in advance by a user.

A terminal for providing the indirect recognition function (hereafter, an "Indirect terminal") may recognize the user by means of a near-field wireless communication module included therein. For example, if TV 105 and refrigerator 107 each include a near-field wireless communication module, the Indirect terminal may be any of the TV 105 and refrigerator 107.

More specifically, during execution of a certain function, the Indirect terminal measures the power of each near-field wireless communication signal emitted from adjacent portable terminals, searches for the terminal with the highest of the measured powers, and determines a portable terminal (the "determined terminal") transmitting the highest signal power among the adjacent portable terminals. In this manner, the Indirect terminal attempts to accurately discern (with some degree of probability) which personal portable terminal (and thereby, which user that is assumed to be associated with that personal terminal) is currently using the Indirect terminal The Indirect terminal also transmits the portable terminal ID information request message to the determined terminal (i.e., before the Indirect terminal actually ascertains that a candidate terminal is the "determined terminal"). In response, the portable terminal ID information is transmitted by the determined terminal, and received at the Indirect terminal For instance, there may be several adjacent portable terminals transmitting signals that are received at the Indirect terminal at different receive signal powers. If each of these adjacent terminals transmits a response to the ID request message, the Indirect terminal can select, as the determined terminal, the adjacent terminal for which the highest signal strength response is received.

The Indirect terminal also generates the recent usage history information including information related to a certain function, generates the user-related information including the received portable terminal ID information, and transmits the generated usage history information and user-related information to the home network server 101.

For instance, refrigerator 107 can provide the user recognition function (directly or indirectly, depending on whether it is equipped with a camera), and generate user ID information for identifying the user of the refrigerator 107 when a certain function is activated by the user in the refrigerator 107. TV 105 also generates recent usage history information indicating a certain operation of the TV 105 executed by the user, and transmits the generated user-related information and usage history information to the home network server 101.

The home network server 101 (hereafter, "server 101" or "the server") stores "user information" corresponding to a certain function of a terminal based on the user-related information and usage history information transmitted thereto by the terminal (and/or by an adjacent terminal, described later).

Specifically, server 101 establishes a connection between terminals having home network connectivity. To this end, the server searches for terminals having the home network connectivity among terminals included in the house and establishes a connection between the searched terminals and server 101. For example, in the case terminals having the home network connectivity are the TV 105 and the refrigerator 107, the server may establish a network connection between TV 105, the refrigerator 107, and the home network server 101 itself Server 101 generates mapping information by mapping the various terminals onto a house schematic, taking into account the terminals connected thereto.

More specifically, server 101 determines whether the user recognition function has been set up at any of the network-connected terminals. As mentioned earlier, the system 100 may be set up such that the user recognition function for the various terminals is always set up, or, it may be set up only periodically. When the user recognition function is set up, the server automatically maps the terminals connected thereto onto the house schematic. Furthermore, the server determines whether another terminal to be added to the house schematic is selected by the user. If another terminal is selected, server 101 displays a model of the selected terminal on the server's display, and if the displayed terminal model is arranged on the house schematic by the user, it maps the selected terminal onto the house schematic. The server also generates mapping information including terminal identifiers for identifying the terminals mapped onto the house schematic and location information of the terminals.

The server 101 also generates recognition information of adjacent terminals (hereafter, "RIAT", for brevity) based on the mapping information. RIAT refers to an adjacent terminal(s) to a particular terminal that can perform a user recognition function when the particular terminal cannot perform the user recognition function. Using the mapping information, the server identifies the location information of the terminals and identifies at least one of the terminals that has the user recognition function. Using the location information of the thus identified terminal(s), the server also identifies adjacent terminals capable of performing the user recognition function for the particular terminal The server also generates the RIAT including an identifier of the adjacent terminal to correspond to the identifier of the particular terminal.

The server determines whether a certain function of a particular network-connected terminal is being executed, where the particular terminal may be either a specific terminal or a random terminal capable of performing the certain function, depending on the system design. By way of example, if a menu function of the TV 105 is accessed, this may be considered a predetermined certain function which would cause server 101 to ascertain the identity of the TV 105 user, in order to provide commands to better assist that user. In another example, the certain function could be any operational use of TV 105. If the certain function is being executed, the server checks if the particular terminal provides the user recognition function. If yes, the server 101 determines whether the user recognition function to be executed by the particular terminal is the direct recognition function. If so, the server receives from that terminal the user-related information and recent usage history information generated by using the direct recognition function.

Otherwise, if only the indirect recognition function is available, the server receives from the particular terminal the user-related and usage history information generated by using the indirect recognition function.

If, however, the particular terminal provides no user recognition function, the server uses the recognition information of adjacent terminals (RIAT) to search for a terminal capable of recognizing a user of the particular terminal among terminals adjacent to the particular terminal For this, server 101 transmits an activation request message to a searched terminal(s) which requests activation of a user authentication function. Once a suitable adjacent terminal is chosen and the user is recognized or authenticated, server 101 receives from the particular terminal the usage history information, e.g., recent usage information for the certain function. The server also receives the user-related information generated and transmitted by the chosen adjacent terminal Server 101 generates "user information" which may include an identifier indicating the user of the particular terminal based on pre-stored family information, taking into account the received user information. The family information may include information about every member of the family. For example, the family information may include every family member's photo, portable terminal number, and the like.

Server 101 may correctly identify a user who is using/commanding the certain function of the particular terminal by comparing the user-related information (e.g., the captured image) with the user information. Server 101 may thereafter transmit commands to carry out the certain function in correspondence with prior usage history information or characteristics for that user. For instance, in the case of a TV or a menu function, if the recognized user is a child, the commands might be tailored towards the intelligence/knowledge/choices suitable for a child rather than for those of an adult.

Figure 2:
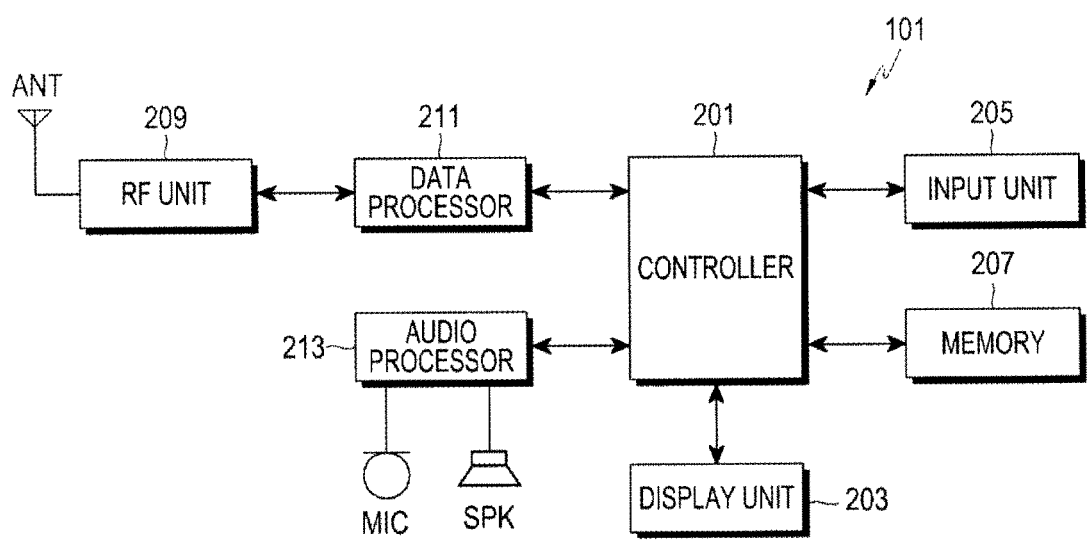
FIG. 2 is a block diagram of a home network server, according to an embodiment.

FIG. 2 is a functional block diagram of the home network server 101, according to an embodiment of the present invention. The block diagram can also represent an arrangement of relevant electronics for any of the terminals in the home network, e.g., terminal 103, 105 or 107. The following description will describe the components mainly in the context of the server 201; however, it is understood that the description is equally applicable to the other terminals, with the exception of the specific operations that would only be performed by a home network server rather than another network-connected terminal "Server/terminal" is used in some instances to refer to a component description applicable to either the server or a terminal Server 101 includes a controller 201, a display unit 203, an input unit 205, a memory 207, a radio frequency (RF) unit 209, a data processor 211, and an audio processor 213.

The RF unit 209 performs radio communication functionality of the server/terminal More specifically, the RF unit 209 includes a radio transmitter for up-converting a transmit signal and amplifying the signal, and a radio receiver for performing low-noise amplification on a received signal and down-converting the received signal. The data processor 211 includes a transmitter for encoding and modulating the signal to be transmitted, and a receiver for demodulating and decoding the received signal. Here, the data processor 211 may consist of a modem and a CODEC, and the CODEC may have a data CODEC for e.g., packet data processing, or an audio CODEC for e.g., audio signal processing.

The audio processor 213 plays a received audio signal output by the data processor 211, through a speaker, or transmits an audio signal generated by a microphone to the data processor 211 for transmission. The input unit 205 has keys for entering information of numbers and characters, and function keys for establishing various functionalities, and the display unit 203 displays image signals onto a screen and displays data requested by the controller 201 to be output. In the case the display unit 203 is implemented as a capacitive touchscreen display or a resistive touchscreen display, the input unit 205 may only include a minimum number of preset keys while the display unit 203 may take over some of key input functionalities of the input unit 205.

The memory 207 includes a program memory and a data memory. The program memory stores a booting system and an operating system (hereinafter, referred to as 'OS') for controlling general operations of the server/terminal, and the data memory stores various data occurred in the operation of the server/terminal Especially, the memory 207 stores the recognition information of adjacent terminals (RIAT) and the above-described user information. As described above, RIAT is information for recognizing a user who requested a certain function to be executed in a particular terminal that lacks user-recognition capability, and for representing at least one terminal adjacent to the particular terminal The RIAT may include an identifier of the particular terminal and an identifier of the adjacent terminal that recognizes a user of the particular terminal, as shown in Table 1.

TABLE 1

| Identifier of Particular Terminal | Identifier of Adjacent Terminal |
|---|---|
| aaaa | bbbb |
| cccc | dddd |

Either 'aaaa' or 'cccc' represents the identifier of the particular terminal, and either 'bbbb' or 'dddd' the identifier of the adjacent terminal that recognizes the user of the particular terminal The usage history information includes an identifier indicating a certain function being executed by the user in the particular terminal. For example, in a case of the particular terminal being TV 105 and the certain function being executed by the user is watching a movie channel (e.g., HBO), the usage history information may include an identifier indicating the watching of that movie channel. The user information includes an identifier indicating the user who requests to execute the certain function. For example, in the case the user who requests to watch the movie channel with TV 105 is 'A', the user information may include an identifier of the user 'A'.

The controller 201 controls the overall operations of the server/terminal. Especially, the controller 201 stores user information in correspondence with a certain function of the particular terminal using the user-related information received from a terminal. All of the above-described functionality of the server/terminal may be controlled primarily by controller 201.

Specifically, the controller 201 of the server controls the establishment of a connection between the terminals having home network connectivity. The controller 201 searches for terminals having the home network connectivity among terminals included in the house, and establishes a connection between the searched terminals and the home network server 101. For example, in the case terminals having the home network connectivity are the imaging device 105 and the refrigerator 107, the controller 201 may establish a connection between the imaging device 105, the refrigerator 107, and the home network server 101.

The controller 201 generates mapping information by mapping the terminals onto the house schematic, taking into account the terminals connected to the home network server 101.

Specifically, the controller 201 determines whether the user recognition function is requested to be set up. If determining that the user recognition function is requested to be set up, the controller 201 automatically maps the terminals connected to the home network server 101 onto the house schematic. Furthermore, the controller 201 determines whether another terminal to be added to the house schematic is selected by the user. If the another terminal is selected, the controller 201 displays a model of the selected terminal, and if the displayed model of the terminal is arranged on the house schematic by the user, maps the selected terminal onto the house schematic. The controller 201 also generates the mapping information including terminal identifiers for identifying the terminals mapped onto the house schematic and location information of the terminals.

The controller 201 generates recognition information regarding adjacent terminals based on the mapping information. Using the mapping information, the controller 201 identifies the location information of the terminals and identifies at least one of the terminals that has the user recognition function. Using the location information of the identified at least one of the terminals, the controller 201 identifies adjacent terminals capable of performing the user recognition function for the at least one of the terminals. The controller 201 generates the recognition information regarding adjacent terminals including an identifier of the adjacent terminal to correspond to the identifier of the at least one of the terminals.

The controller 201 determines whether a certain function of a certain terminal among terminals connected to the home network is being executed. If the certain function of the certain terminal is being executed, the controller 201 checks if the certain terminal provides the user recognition function.

Based on the check result, the controller 201 determines whether the user recognition function to be executed by the certain terminal is the direct recognition function. If it is the direct recognition function, the controller 201 receives from the certain terminal the usage history information and the user-related information generated by using the direct recognition function.

Otherwise, if it is the indirect recognition function, the controller 201 receives from the certain terminal the usage history information and the user-related information generated by using the indirect recognition function.

Or else, if the certain terminal provides no user recognition function, the controller 201 uses the recognition information regarding adjacent terminals to search for a terminal capable of recognizing the user of the certain terminal among terminals adjacent to the certain terminal, and transmits a user authentication function activation request message to request to activate a user authentication function to the searched terminal The controller 201 further receives from the certain terminal the usage history information including information related to the certain function, and the user-related information generated by using the user recognition function of the searched terminal The controller 201 generates user information including an identifier indicating the user of the certain terminal based on the pre-stored family information, taking into account the received user-related information. The family information includes information about every member of the family. For example, the family information may include every family member's photo, portable terminal number, and the like.

The controller 201 may correctly identify a user who requests the certain function of the certain terminal by storing the user information to correspond to the usage history information.

Figure 3:
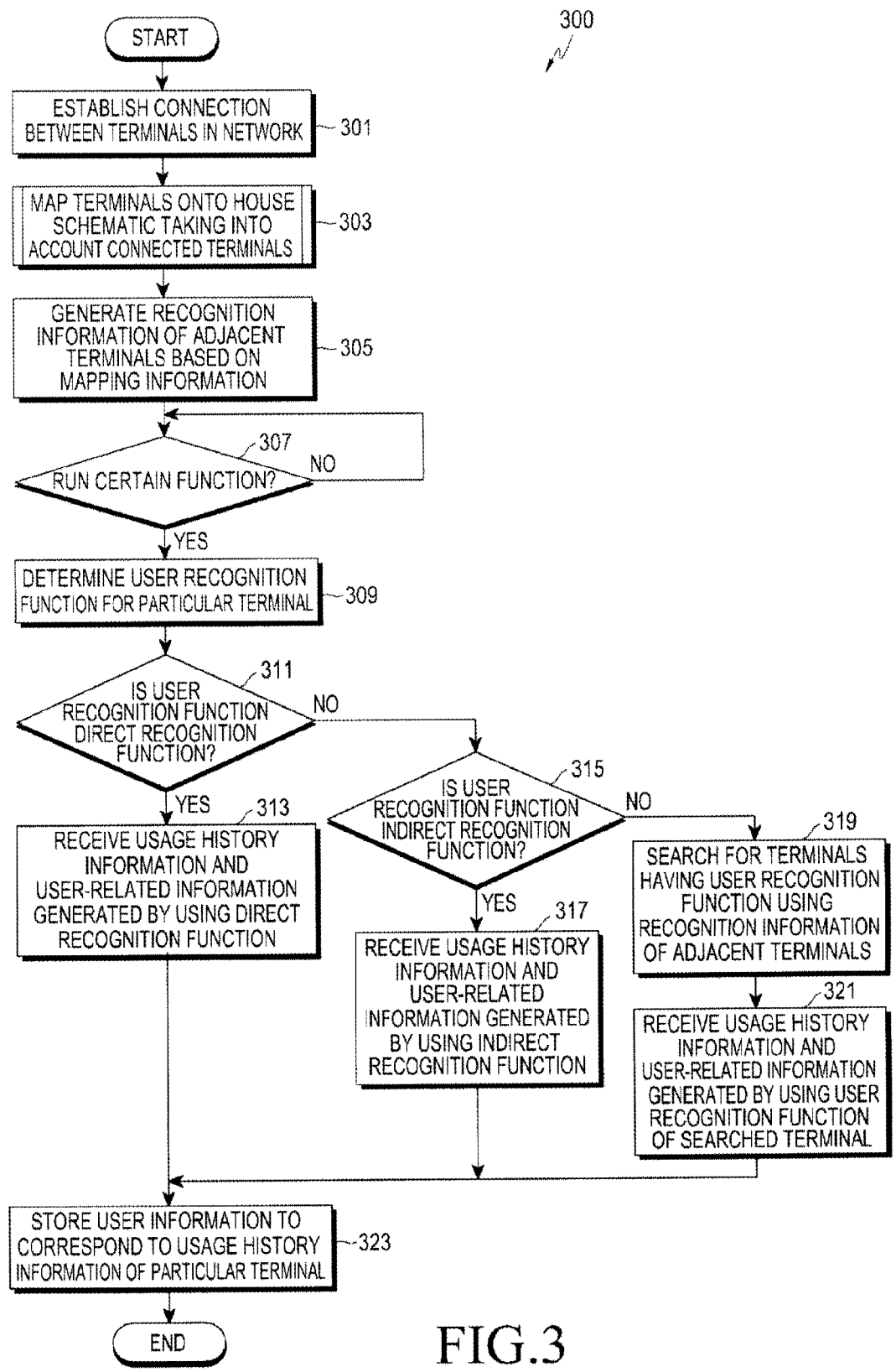
FIG. 3 is a flowchart of a method for storing user information in the home network server, according to an embodiment.

FIG. 3 is a flowchart depicting an exemplary method, 300, of storing user information in the home network server 101, according to an embodiment of the present invention. Server 101 establishes a connection between the terminals having the home network connectivity, in step 301, and then proceeds to step 303. For instance, the server searches for terminals having the home network connectivity among terminals included in the house, and establishes a connection with the searched terminals. For example, in the case terminals having the home network connectivity are TV 105 and the refrigerator 107, the server may establish a connection between TV 105, the refrigerator 107, and the home network server 101 itself The server 101 generates mapping information by mapping the terminals onto the house schematic, taking into account the terminals connected thereto in step 303, and proceeds to step 305.

Figure 4:
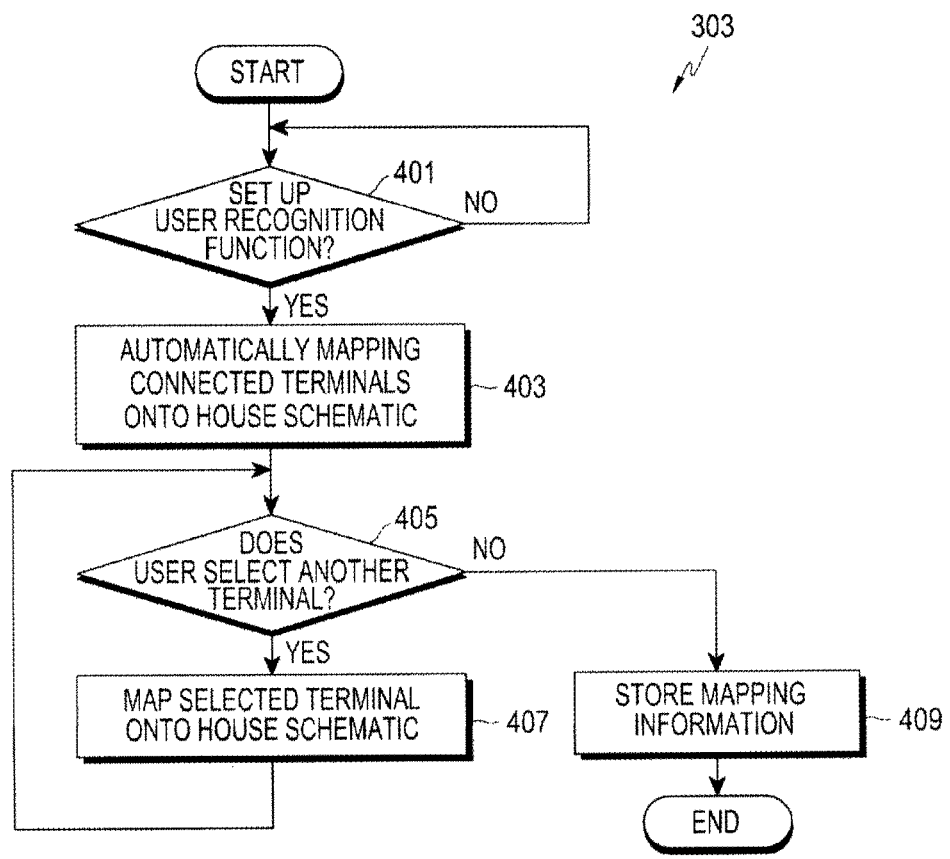
FIG. 4 is a flowchart depicting example operations of step 303 of FIG. 3, in which terminals are mapped onto a house schematic, according to an embodiment.

Referring temporarily to FIG. 4, a flowchart depicting example operations of step 303 is shown. In step 401, server 101 determines whether the user recognition function is requested by a user to be set up. If yes, server 101 proceeds to step 403; if no, it repeats step 401.

The server 101 automatically maps terminals connected thereto onto the house schematic in step 403, and proceeds to step 405. Furthermore, in step 403, the server determines whether another terminal to be added to the house schematic is selected by the user. If so, server 101 proceeds to step 407; if not, it proceeds to step 409.

The server displays a model of the selected terminal and the house schematic, and if the user arranges the displayed model of the selected terminal on the house schematic, maps the selected terminal onto the house schematic, in step 407, and proceeds to step 409. In step 409, server 101 generates the mapping information including terminal identifiers for identifying the terminals mapped onto the house schematic and location information of the terminals.

Returning to FIG. 3, server 101 generates the recognition information of adjacent terminals based on the mapping information, in step 305, and proceeds to step 307. At this time, using the mapping information, the server identifies the location information of the terminals and identifies at least one terminal that does not have the user recognition function. Using the location information of the at least one terminal, server 101 also identifies adjacent terminals capable of performing the user recognition function for the at least one terminal. Server 101 also generates the recognition information of adjacent terminals including an identifier of the adjacent terminal, corresponding to the identifier of the at least one terminal In step 307, the server 101 determines whether a certain function of a particular terminal is being executed. If yes, server 101 proceeds to step 309; if not it repeats the step 307.

In step 309, the server checks if the particular terminal provides the user recognition function, and in step 311, the server determines whether the user recognition function to be executed by the particular terminal is the direct recognition function. If the direct recognition function is discerned, server 101 proceeds to step 313, else, it proceeds to step 315.

The server 101 receives from the particular terminal the usage history information and the user-related information generated by using the direct recognition function, in step 313, and then proceeds to step 323. In step 315, the server determines whether the user recognition function to be executed by the particular terminal is the direct recognition function. If so, the server 101 proceeds to step 317, else, it proceeds to step 319.

The server 101 receives from the particular terminal the usage history information and the user-related information generated by using the indirect recognition function, in step 317, and then proceeds to step 323.

At step 319, server 101 uses the recognition information of adjacent terminals (RIAT) to search for a terminal capable of recognizing the user of the particular terminal among terminals adjacent to the particular terminal and transmits a user authentication function activation request message to request to activate a user authentication function to the searched terminal, and proceeds to step 321. The home network server further receives from the particular terminal the usage history information including information related to the certain function. The server also receives the user-related information generated by using the user recognition function of the searched terminal, in step 321, and proceeds to step 323.

In step 323, the home network server 101 generates user information including an identifier indicating the user of the particular terminal based on the pre-stored family information, taking into account the received user-related information. The family information can include information about every member of the family. For example, the family information may include every family member's photo, portable terminal number, and the like.

The home network sever 101 may correctly identify a user who requests the certain function of the certain terminal by storing the user information to correspond to the usage history information.

Figure 5:
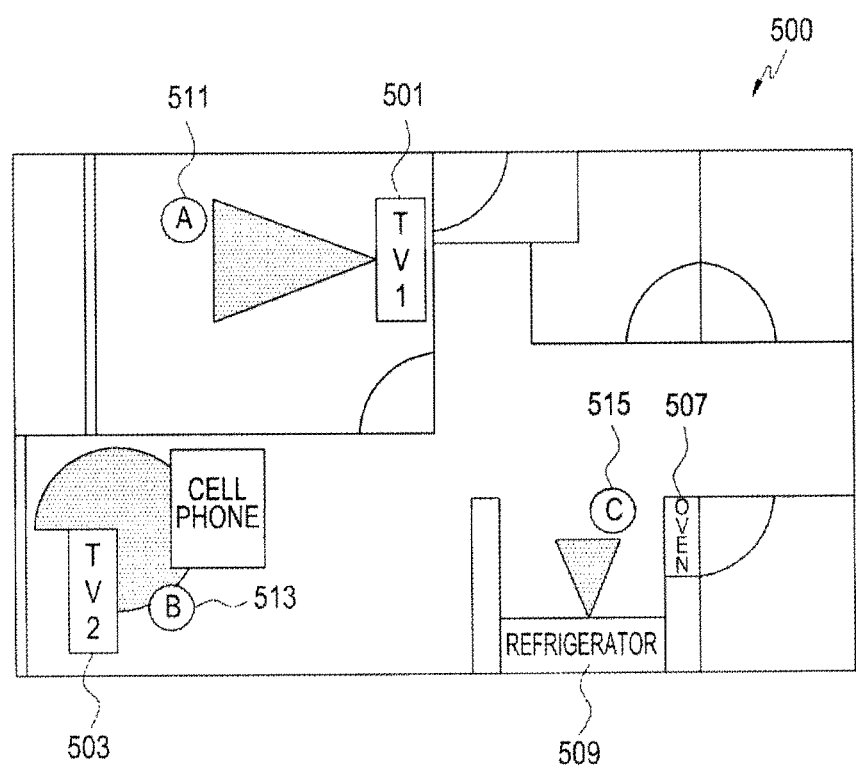
FIG. 5 is an example house schematic onto which terminals are mapped.

FIG. 5 is an example house schematic 500 onto which terminals can be mapped by the home network server 101. In this example, the server 101 generates mapping information by mapping a first imaging device (hereafter, "first TV") 501, a second imaging device ("second TV") 503, an oven 507, and a refrigerator 509 onto the house schematic. The first and second TVs 501 and 503, the oven 507, and the refrigerator 509 are terminals, each of which provides home network connectivity and may be connected to server 101. For example, assume that first TV 501 and the refrigerator 509 provide direct recognition functions, the second TV 503 provides the indirect recognition function, and the oven 507 provides no user recognition function.

Under these conditions, server 101 searches for at least one terminal capable of recognizing the user of the oven 507 based on the mapping information. For example, the search may be initiated as soon as a user touches any control on the oven, or only when a predetermined function of the oven is initiated. If the refrigerator 509 is searched out as the terminal capable of recognizing the oven user, server 101 generates the recognition information of adjacent terminals (RIAT) indicating that the refrigerator 509 is capable of recognizing the oven user. A camera of refrigerator 509 then captures an image of the user and transmits it to server 101, while oven 507 transmits information regarding the control functions currently used.

If a user "A" 511 requests a certain function (e.g., watching a certain channel) of the first TV 501, server 101 determines whether the first TV 501 provides the user recognition function. Since the first TV 501 provides the direct recognition function, server 101 receives the user-related information generated via the direct recognition and thereafter transmitted by the first TV 501. Server 101 also receives new usage history information of the first TV 501. The server 101 uses the received user-related information to generate the user information including an identifier that indicates a user who requests a certain channel to be watched, and stores the new usage history information to correspond to the generated user information. That is, a new usage history entry is stored in association with the recognized user.

If a user B 513 requests a certain function (e.g., watching a particular channel) of the second TV 503, server 101 determines whether the second TV 503 provides the user recognition function. Since the second TV 503 provides the indirect recognition function, server 101 receives the user-related information and the new usage history information generated, the former having been obtained via the indirect recognition function of the second TV 503. The server 101 uses the received user-related information to generate the user information including an identifier that indicates a user who requests the particular channel to be watched, and stores the new usage history information in association with the generated user information.

If a user C 515 requests a certain function (e.g., a function of cooking fried fish) of the oven 507, server 101 determines whether the oven 507 provides the user recognition function. Since the oven 507 does not provide the user recognition function, the server 101 uses the recognition information of adjacent terminals (RIAT) to search for a terminal capable of recognizing the oven user. Since the refrigerator is searched out as the terminal capable of recognizing the oven user, the server 101 transmits the user recognition function execution request message to the refrigerator 509, receives from the refrigerator 509 the user-related information in response to the request message, and stores a new usage history entry for the oven 507. The server 101 uses the received user-related information to generate the user information including an identifier that indicates a user who requests a certain oven function to be performed, and stores the new usage history entry corresponding to the generated user information.

Accordingly, when a certain function is executed by a particular terminal connected in the home network, user information indicating a user who requests the execution of the certain function is stored, thus clearly revealing the user. The home network server thereby builds a database storing a variety of user-specific information, and such information may be used to better assist users in the current and/or future use of the various terminals. The database information may alternatively be used strictly for monitoring purposes.

The above-described methods according to the present disclosure can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Several embodiments have been described in connection with e.g., mobile communication terminals, but it will be understood that various modifications can be made without departing the scope of the present invention. Thus, it will be apparent to those ordinary skilled in the art that the invention is not limited to the embodiments described, but can encompass not only the appended claims but the equivalents.

What is claimed is:

1. An apparatus for storing user information in a home network, the apparatus comprising:
 a memory to store a house schematic; and
 a controller to:
  determine whether an user recognition function is requested,
  generate mapping information by mapping a plurality of terminals connected to the home network onto the house schematic corresponding to the determination,
  generate, based on the mapping information, information associated with at least one adjacent terminal to a particular terminal, the adjacent terminal capable of recognizing a user of the particular terminal,
  check whether the particular terminal provides the user recognition function when a certain function of the particular terminal is executed,
  generate user information based on user-related information transmitted from the adjacent terminal to recognize the user of the particular terminal, and
  store the user information in association with usage history information for the certain function,
 wherein the controller identifies a location information of the terminals, and identifies the adjacent terminals capable of performing the user recognition function by using the location information of the at least one terminal.

2. The apparatus of claim 1, wherein the mapping information comprises the location information of the plurality of terminals on the house schematic.

3. The apparatus of claim 1, wherein the information associated with at least one adjacent terminal comprises an identifier of the particular terminal and an identifier of the adjacent terminal.

4. The apparatus of claim 1, wherein the user information comprises an identifier of a user who requests the certain function to be executed.

5. The apparatus of claim 1, wherein if another terminal provides a direct recognition function for recognizing a user in a direct manner, the controller receives from the another terminal usage history information and user-related information of the another terminal; and uses the user-related information of the another terminal to generate user information.

6. The apparatus of claim 1, wherein if another terminal provides an indirect recognition function for recognizing a user in an indirect manner, the controller receives from the another terminal usage history information and user-related information of the another terminal, and uses the user-related information of the another terminal to generate user information.

7. The apparatus of claim 1, wherein if the particular terminal does not provide any user recognition function, the controller uses the information associated with at least one adjacent terminal to search for an adjacent terminal capable of recognizing the particular terminal, transmits a user recognition function execution request message to a searched adjacent terminal and receives the usage history information from the particular terminal.

8. A method of storing user information in a home network, the method comprising:
 determining whether an user recognition function is requested;
 generating mapping information by mapping at least one terminal connected to the home network onto a pre-stored house schematic corresponding to the determination;

generating, based on the mapping information, information associated with at least one adjacent terminal to a particular terminal, the adjacent terminal capable of recognizing a user of a particular terminal;

checking whether the particular terminal provides the user recognition function when a certain function of the particular terminal is executed;

generating user information based on user-related information transmitted from the adjacent terminal to recognize the user of the particular terminal; and storing the user information in correspondence with usage history information for the certain function, wherein the method further comprises identifying a location information of the terminals, and identifying the adjacent terminals capable of performing the user recognition function by using the location information of the at least one terminal.

9. The method of claim 8, wherein the mapping information comprises the location information of the at least one terminal on the house schematic.

10. The method of claim 8, wherein the recognition information regarding adjacent terminals comprises an identifier of the at least one terminal and an identifier of the adjacent terminal, correspondingly.

11. The method of claim 8, wherein the user information comprises an identifier of a user who requests the certain function to be executed.

12. The method of claim 8, further comprising:
if another terminal provides a direct recognition function for recognizing a user in a direct manner, receiving from the another terminal usage history information and user-related information of the another terminal; and generating user information based on the user-related information of the another terminal.

13. The method of claim 8, further comprising
if another terminal provides an indirect recognition function for recognizing a user in an indirect manner, receiving from the another terminal usage history information and user-related information of the another terminal, and generating user information based on the user-related information of the another terminal.

14. The method of claim 8, wherein the generating of the user information comprises,
if the particular terminal does not provide any user recognition function, searching for an adjacent terminal capable of recognizing the particular terminal based on the information associated with at least one adjacent terminal;

transmitting a user recognition function execution request message to the searched adjacent terminal; and receiving user-related information including information related to the user from the searched adjacent terminal, and the usage history information from the particular terminal.

* * * * *